(12) United States Patent
Patterson

(10) Patent No.: US 6,489,753 B1
(45) Date of Patent: Dec. 3, 2002

(54) SYSTEM AND METHOD FOR MONITORING BATTERY EQUALIZATION

(75) Inventor: Ciaran J. Patterson, Chicago, IL (US)

(73) Assignee: C. E. Niehoff & Co., Evanston, IL (US)

( * ) Notice: Subject to any disclaimer, the term of this patent is extended or adjusted under 35 U.S.C. 154(b) by 0 days.

(21) Appl. No.: 09/989,664

(22) Filed: Nov. 19, 2001

(51) Int. Cl.[7] .................................................. H02J 7/14
(52) U.S. Cl. ..................................................... 320/162
(58) Field of Search ................................ 320/119, 124, 320/162; 324/427

(56) References Cited

U.S. PATENT DOCUMENTS

| | | |
|---|---|---|
| 4,479,083 A | 10/1984 | Sullivan |
| 4,967,136 A | 10/1990 | Nofzinger |
| 5,479,083 A | 12/1995 | Brainard |
| 5,528,122 A | 6/1996 | Sullivan et al. |
| 5,666,041 A | 9/1997 | Stuart et al. |
| 6,150,795 A | 11/2000 | Kutkut et al. |
| 6,194,877 B1 | 2/2001 | Judge et al. |
| 6,265,851 B1 | 6/2001 | Brien et al. |
| 6,310,556 B1 * | 10/2001 | Green et al. ................. 340/539 |
| 6,417,648 B2 * | 7/2002 | Suzuki et al. ............... 320/136 |

* cited by examiner

Primary Examiner—Gregory J. Toatley, Jr.
(74) Attorney, Agent, or Firm—Brinks Hofer Gilson & Lione

(57) ABSTRACT

A system and method for protecting against battery overcharging is used with an automotive electrical system having an alternator that supplies an output voltage $V_{OUT}$ to a string of at least first and second series-connected rechargeable batteries, an equalizer coupled to at least the first and second batteries, and at least a higher voltage load or a lower voltage load connected across respective sets of batteries of the string. The voltage $V_{OUT}$ is regulated to a target value $V_{TARGET}$, and this target value $V_{TARGET}$ is reduced when either the voltage $V_1$ across the first battery exceeds a first threshold value $T_1$ or when a voltage $V_2$ across the second battery exceeds a second threshold value $T_2$. In this way, both of the batteries are protected against over-voltage conditions. A warning signal is illuminated to indicate to a user when either of the batteries is outside of its normal operating range.

12 Claims, 5 Drawing Sheets

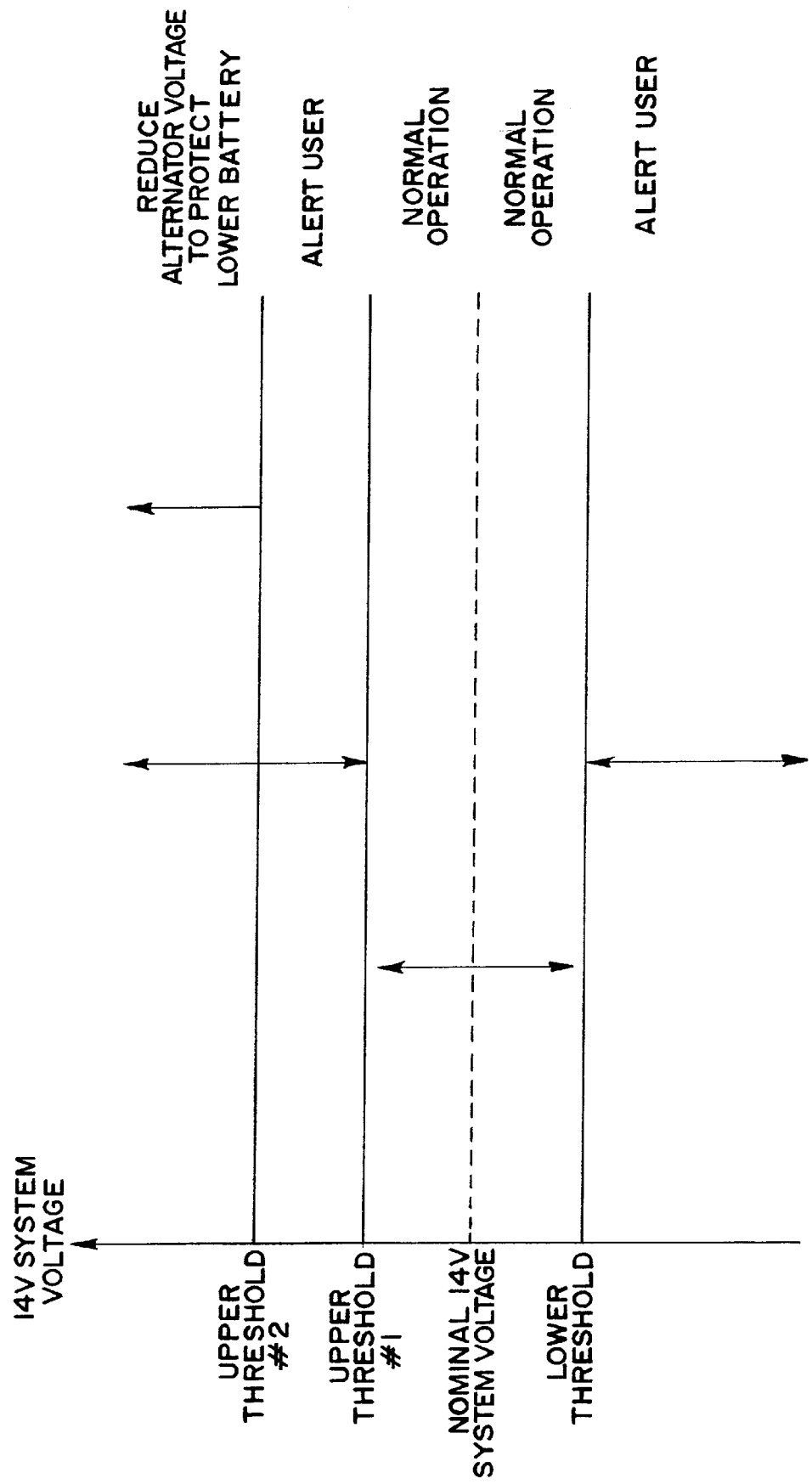

SYSTEM AND METHOD FOR MONITORING BATTERY EQUALIZATION

BACKGROUND

This invention relates to vehicle electrical systems that use more than one operating voltage. There are a variety of means to attain multiple voltages in a vehicle, e.g. an automotive system, and one of them involves the use of an alternator that powers, among other loads, a battery equalizer. The purpose of the battery equalizer is to balance the charge among series-connected batteries to ensure equal charging. This is especially important if to one of the series-connections between the batteries represents a point where electrical loads are connected.

The charge voltage at the highest series-connected battery potential is typically controlled by a voltage regulator that controls the output voltage of the alternator. Series-connected batteries all need similar charge characteristics if they are to be equally recharged in series. If an intermediate operating voltage is derived from a series connection between batteries, the electrical loads at that point will unbalance the electrical charge that is attempting to recharge the battery at the lower potential. Also, if batteries with different charge characteristics are series connected, there will be unbalanced charging. In any type of unbalanced series charging, the battery at the higher potential will tend to overcharge, and the battery at the lower potential will tend to undercharge. In time, the overcharging battery will be destroyed, and the entire electrical system will malfunction.

An equalizer prevents battery charge imbalance because it has the capability of shunting current from the higher potential to the lower potential in order to maintain an equal potential across each of the batteries in series. However, an equalizer is a current rated device and typically has a protective circuit that prevents operating beyond its rated limit. If excessive electrical loads or a deeply discharged battery causes the operating current to exceed the equalizer rating, the equalizer may malfunction, shut down, or continue operating at its self imposed protective limit. In each of these cases the equalizer will cease to perform its equalizing function, and the higher potential battery will overcharge while the lower potential battery will undercharge.

Prior art battery charging systems that include equalizers are described in Brainard U.S. Pat. No. 5,479,083, Kutkut U.S. Pat. No. 6,150,795, Stuart U.S. Pat. No. 5,666,041, Sullivan U.S. Pat. No. 5,528,122, Nofzinger U.S. Pat. No. 4,967,136, and Sullivan U.S. Pat. No. 4,479,083.

SUMMARY

By way of general introduction, the preferred embodiment described below seeks to overcome the limitation of the equalizer described above by introducing a voltage regulator that monitors the voltage at the series connection of series-connected batteries. The regulator is programmed to identify when an overload or malfunction occurs across any of the individual battery voltages. If this happens, the voltage regulator can adjust its regulated setting to a voltage that prevents the malfunctioning battery from overcharging. This, of necessity, may cause other batteries in the series to be undercharged, but at least it will prevent permanent overcharge damage and unsafe operation. A fault signal to alert the operator of this condition is provided. If the malfunction or overloaded condition cannot be corrected within the programmed range of output voltage adjustment, the regulator will turn off the alternator. If the overloaded condition corrects itself, the voltage regulator may return to normal operation at its original regulated setting.

This section has been provided by way of general introduction only, and it is not intended to narrow the scope of the following claims.

BRIEF DESCRIPTION OF THE DRAWINGS

FIG. 5 is a graph illustrating operation of the monitor of FIG. 1.

DETAILED DESCRIPTION OF THE DRAWINGS

Figure 1:
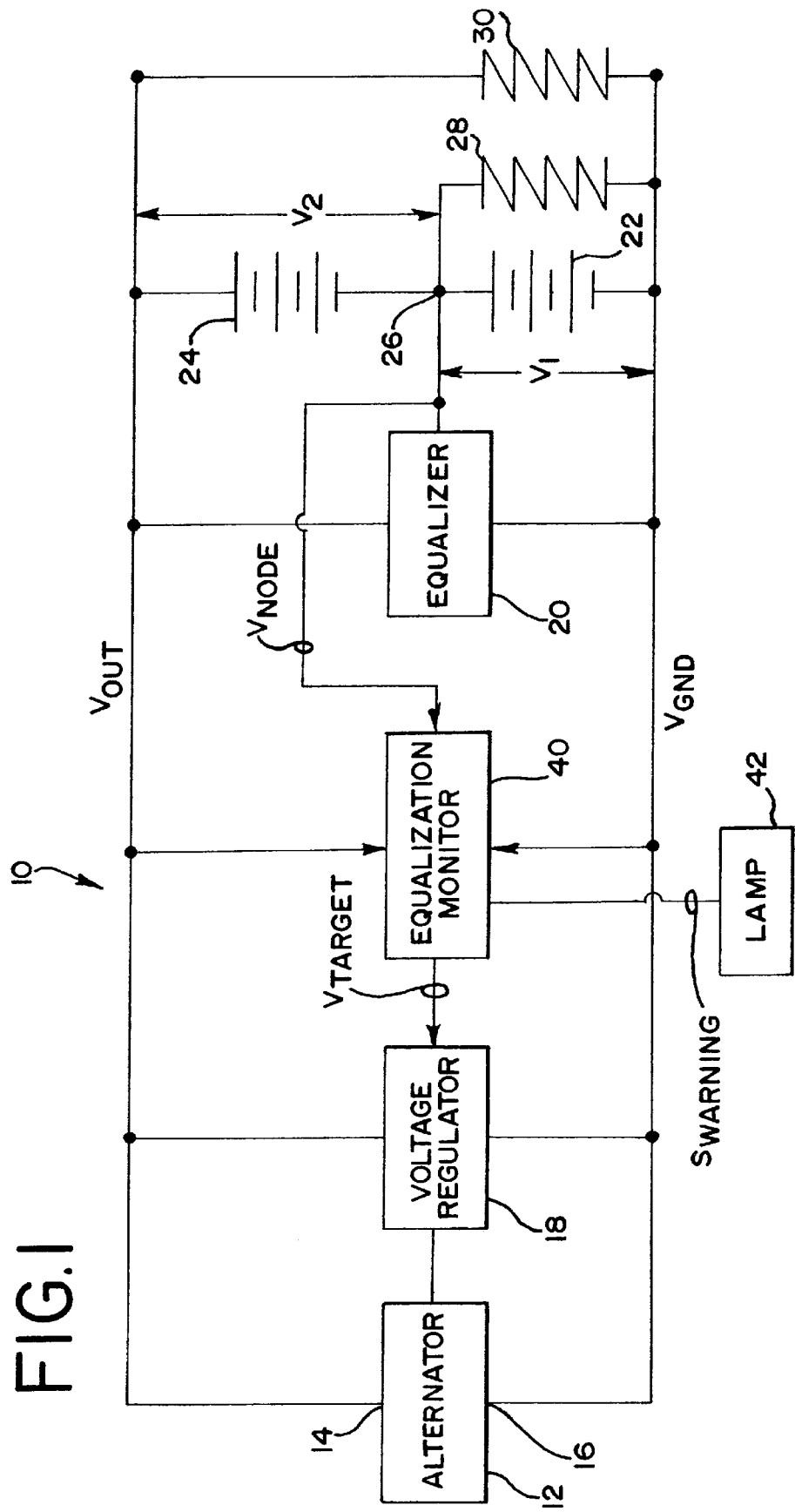
FIG. 1 is a block diagram of a battery charging system that incorporates a preferred embodiment of this invention.

Turning now to the drawings, FIG. 1 shows a block diagram of a vehicle (e.g. automotive) electrical system 10 that incorporates a preferred embodiment of this invention. The system 10 includes an alternator 12 having output terminals 14, 16. The alternator 12 may for example be driven by an internal combustion engine (not shown), and it generates output voltages $V_{OUT}$ and $V_{GND}$ as shown. A voltage regulator 18 is coupled with the alternator 12. The voltage regulator 18 maintains the output voltage $V_{OUT}$ at a desired output voltage.

The alternator 12 in this example includes an AC generator, a power control element such as a field coil or a rectifier controller, and an AC to DC controlled or uncontrolled converter. A wide variety of devices can be used for the alternator 12, and this invention is not limited to any particular type of alternator. Similarly, the voltage regulator 18 can be implemented in many ways as either an electronic or an electromechanical circuit having the basic function of operating the power control element of the alternator to maintain a specific DC output voltage. The voltage regulator 18 may perform additional functions as well.

The output voltages $V_{OUT}$ and $V_{GND}$ are applied across a string of series-connected batteries, including first and second batteries 22, 24 in this example. The first and second batteries 22, 24 are interconnected at a node 26. A wide variety of energy or power storage elements may be used for the batteries 22, 24, including electrochemical devices such as electrolyte cells and electrostatic device such as capacitors.

An equalizer 20 is coupled to the node 26 and to the output voltages $V_{OUT}$ and $V_{GND}$. The equalizer 20 can be implemented in many ways, including electronic circuits and electromechanical circuits that operate to maintain each of the batteries 22, 24 at an equal proportion of the total voltage drop across the string of series-connected batteries. The example of FIG. 1 includes only two batteries 22, 24 in the string of batteries, but alternative embodiments may include three, four or more batteries connected in series between the output voltages $V_{OUT}$ and $V_{GND}$. The battery 22 is connected to an electrical system having a lower nominal voltage. In one example, the battery 22 may be a lead-acid battery, and the lower voltage system may be a 14V system having a nominal voltage in the range of 10–16V. Though shown as a single battery 22, the 14V system may use two or more 14V batteries connected in parallel with one another. The 14V system powers a 14V load, indicated schematically at 28.

The batteries 22, 24 are connected to a higher voltage system. In this example, the higher voltage system is a 28V system having a nominal voltage in the range of 20–32V. The 28V system may use one or more parallel combinations of two 14V batteries in series, and it powers a 28V load, indicated schematically at 30.

Of course, this invention is not limited to use with 14 and 28V electrical systems. For example, the higher voltage system may be a 42V system having a nominal voltage in the range of 30–48V, and may use one or more parallel combinations of three 14V batteries in series. Thus, the lower voltage system may be at any of various fractions of the higher voltage system, such as ½, ¼ or other fractions.

The system of FIG. 1 is a dual voltage-system in the sense that electrical power is applied to electrical loads at two separate operating voltages. This invention is also useful in multiple-voltage systems having more than two independent operating voltages for electrical loads. For example, 42, 28, and 14V electrical systems may all be connected to a single string of three series-connected 14V batteries connected to a 42V alternator.

The equalizer 20 prevents uneven charging of the batteries 22, 24, as for example uneven charging associated with current drained by the load 28. Such a current drain would, without operation of the equalizer 20, result in an undercharged condition for the battery 22 and therefore an overcharged condition for the battery 24. A multiple-voltage system would typically include an equalizer connected in some way to each battery of the series-connected battery string. The equalizer prevents the lower-voltage loads from resulting in uneven charging of the series-connected-batteries.

The elements 12–30 described above may be entirely conventional, and they may be implemented in many ways. The present invention is readily adapted to use with the widest variety of alternators, voltage regulators, equalizers, batteries, and loads.

As shown in FIG. 1, the system 10 also includes an equalization monitor 40 that is coupled to the output voltages $V_{OUT}$ and $V_{GND}$ as well as to the voltage $V_{NODE}$ of the node 26. As described below, the equalization monitor 40 generates a target voltage $V_{TARGET}$ that is applied to the voltage regulator 18 and that sets the target value for the output voltage $V_{OUT}$. $V_{TARGET}$ may also be a logic signal, e.g., a voltage increment/voltage decrement logic state. The equalization monitor 40 also generates an output signal $S_{WARNING}$ that controls operation of a warning lamp 42. The equalization monitor 40, though shown as a separate block in FIG. 1, can in practice be integrated with the voltage regulator 18.

Figure 2:
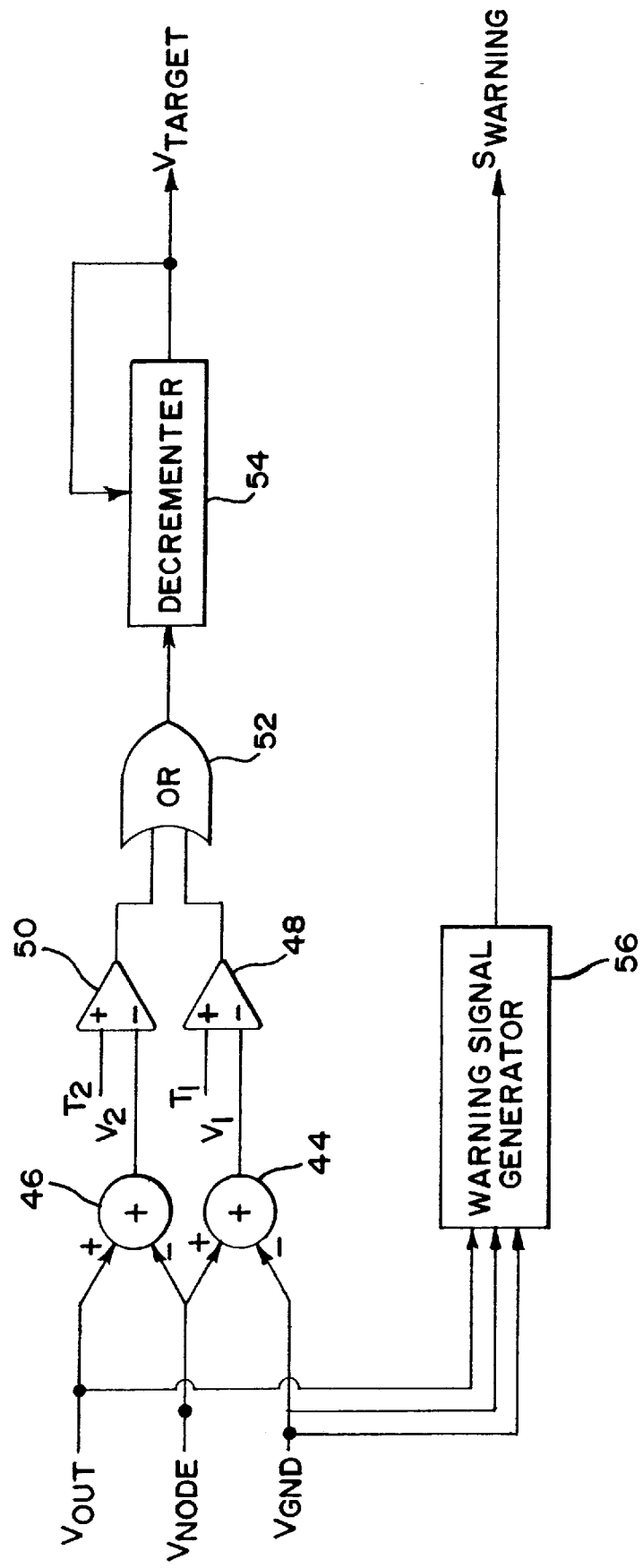
FIG. 2 is a more detailed block diagram of the equalization monitor of FIG. 1.
Figure 3:
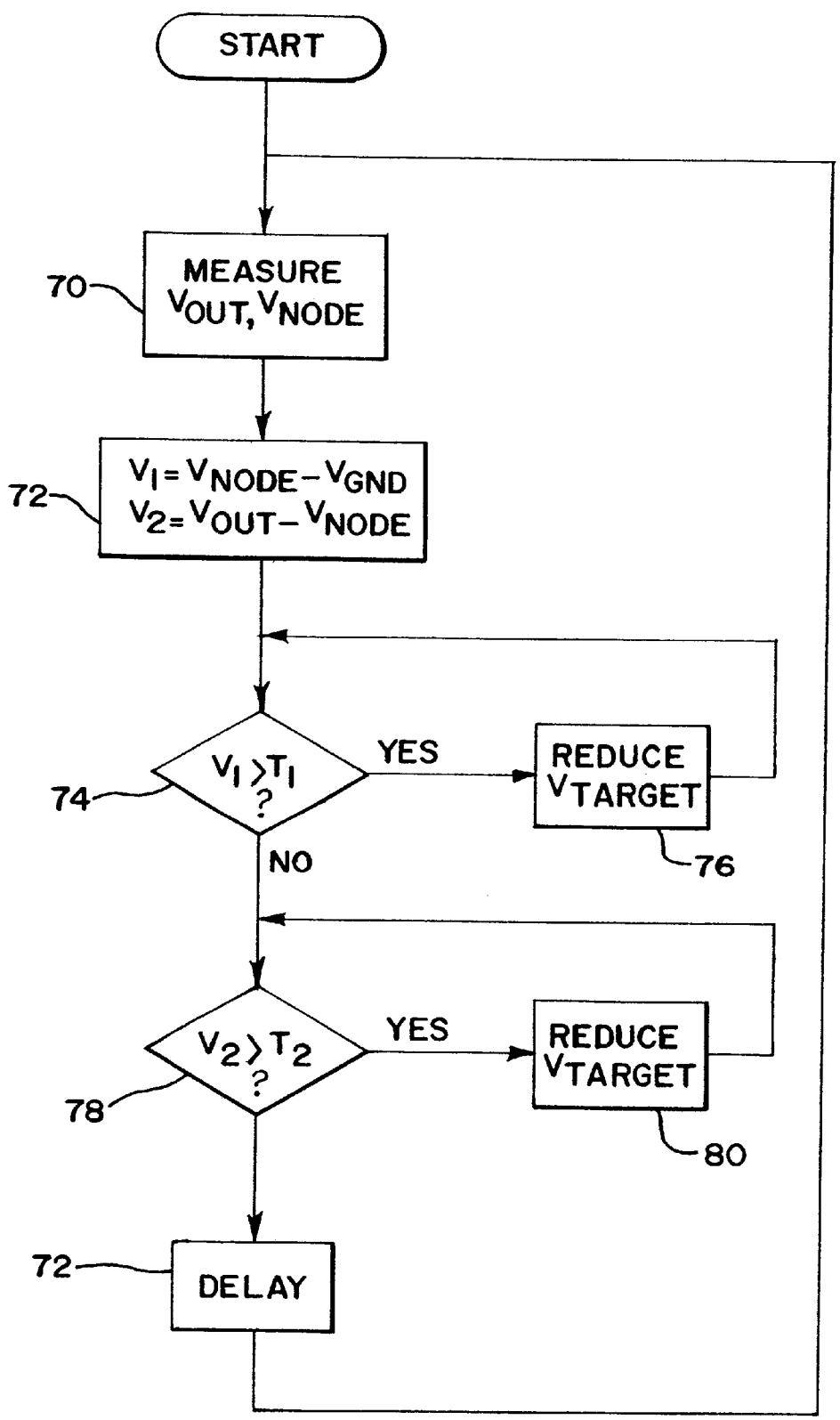
FIGS. 3 and 4 are flow charts of monitoring functions performed by the equalization monitor of FIG. 2.
Figure 4:
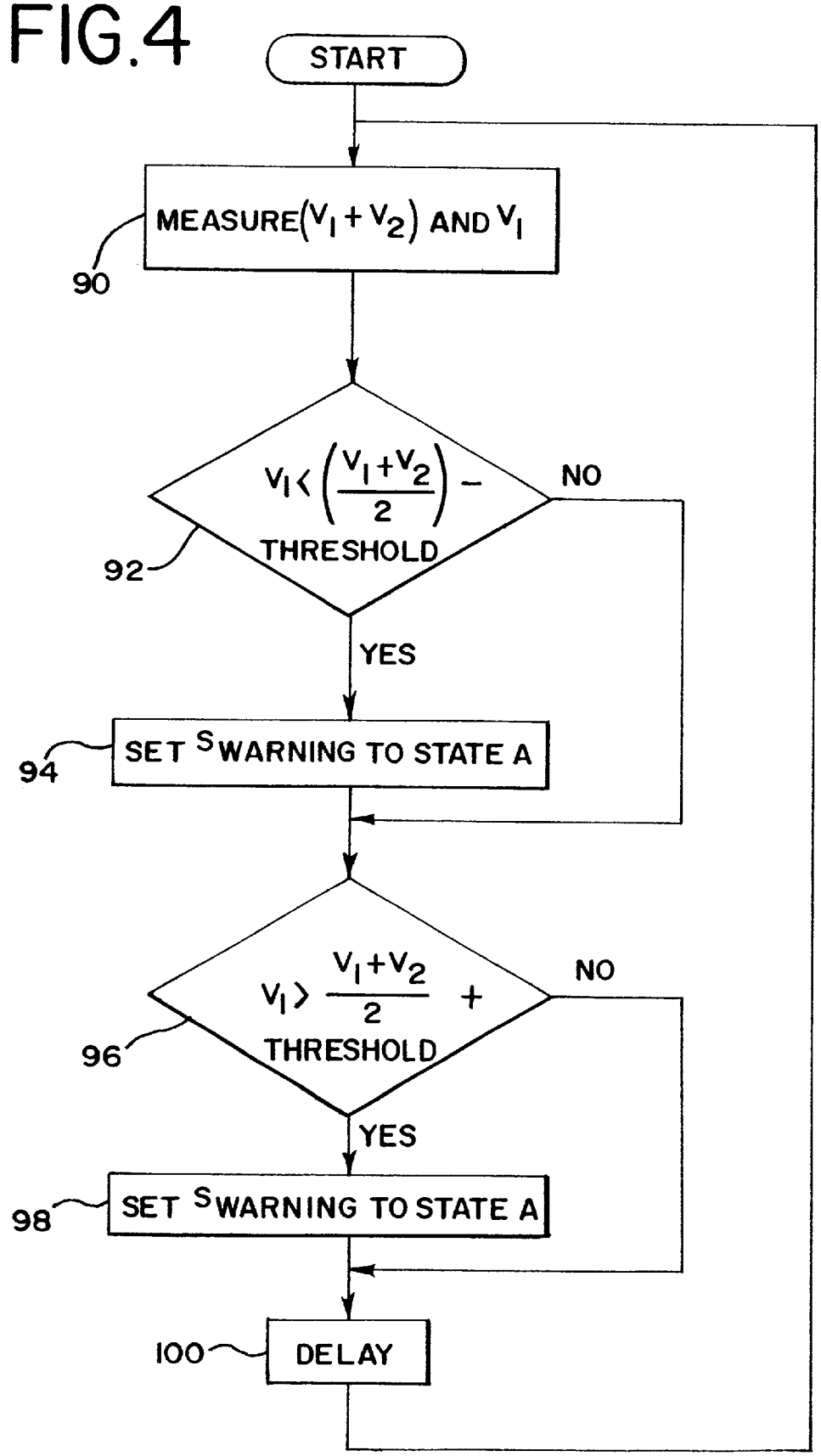

FIG. 2 provides a more detailed block diagram of the equalization monitor 40, and FIGS. 3, 4 and 5 illustrate operation of the equalization monitor 40.

As shown in FIG. 2, the monitor 40 includes first and second adders 44, 46 that are connected to first and second comparators 48 and 50. The first adder 44 generates an output signal $V_1$ that is equal to the difference between $V_{NODE}$ and $V_{GND}$. Thus, the output signal $V_1$ is equal to the voltage drop across the battery 22. The comparator 48 compares the signal $V_1$ with a threshold $T_1$ and generates an output signal commanding operation of a decrementor 54 when the voltage $V_1$ exceeds the threshold $T_1$.

Similarly, the adder 46 generates an output signal $V_2$ equal to the difference between $V_{OUT}$ and $V_{NODE}$. The output signal $V_2$ is indicative of the voltage drop across the battery 24. The signal $V_2$ is applied to the comparator 50, which compares the signal $V_2$ with a threshold $T_2$ and generates an output signal commanding operation of the decrementor 54 when the voltage $V_2$ exceeds the threshold $T_2$.

The output signals of the comparators 48, 50 are applied to an OR gate 52 which controls operation of the decrementor 54. The decrementor 54 reduces or decrements the target value $V_{TARGET}$ in response to commands from either of the comparators 48, 50.

The monitor 40 also includes a warning signal generator 56 that generates the warning signal $S_{WARNING}$ as described below in conjunction with FIG. 4.

FIG. 2 schematically illustrates components of the equalization monitor 40. It should be understood that the equalization monitor 40 can be implemented in many ways, including analog electronics, digital electronics, and programmed processors. FIGS. 3 and 4 illustrate operation of the monitor 40 of FIG. 2.

FIG. 3 flow-charts the operation of the elements 44–54 of FIG. 2. In block 70 of FIG. 3, the monitor measures $V_{OUT}$ and $V_{NODE}$. In block 72, $V_1$ is set equal to $V_{NODE}$ minus $V_{GND}$ and $V_2$ is set equal to $V_{OUT}$ minus $V_{NODE}$. As mentioned above, $V_1$ represents the voltage drop across the battery 22 and $V_2$ represents the voltage drop across the battery 24.

In block 74, $V_1$ is compared with the threshold $T_1$. In the event $V_1$ exceeds $T_1$, the target value $V_{TARGET}$ is reduced in block 76 and control is returned to block 74. This procedure continues until $V_1$ is no longer greater than $T_1$. Control then transfers to block 78, where $V_2$ is compared with the threshold $T_2$. In the event $V_2$ is greater than $T_2$, the target value $V_{TARGET}$ is reduced in block 80 and control is returned to block 78. This loop is repeated until $V_2$ is no longer greater than $T_2$. At this point execution is delayed in block 82, and control is then returned to block 70. In one example, $T_1$ is set equal to the nominal voltage for the battery 22 plus 0.5V, and $T_2$ is set equal to the nominal voltage of the battery 24 plus 0.5V. In this example, $V_1$ and $V_2$ must exceed the respective thresholds $T_1$, $T_2$ for a extended time period (e.g. 3 seconds) before control is transferred to block 76 or 80.

The method diagrammed in FIG. 2 protects the batteries from being overcharged in the event of a failure of the equalizer or in the event that an excessive load reduces the voltage at node 26 excessively.

FIG. 4 provides a flow chart of a method implemented by the warning signal generator 56 of FIG. 2. As shown in FIG. 4, the warning signal generator 56 first measures ($V_1+V_2$) and $V_1$. $V_1+V_2$ is equal to the difference between $V_{OUT}$ and $V_{GND}$, and $V_1$ is equal to the difference between $V_{NODE}$ and $V_{GND}$. In block 92, $V_1$ is compared with a value equal to ($V_1+V_2$)/2 minus a threshold. For example, the threshold may be 0.2V. If $V_1$ is less than this value, control is transferred to block 72 where the warning signal $S_{WARNING}$ is set to state A.

In block 96 $V_1$ is compared with a second value equal to ($V_1+V_2$)/2 plus a threshold. Once again, the threshold may be equal to 0.2V. In the event that $V_1$ exceeds this value, control is transferred to block 98, where the warning signal $S_{WARNING}$ is set to state A. Control is then transferred to block 100, which imposes a delay on execution, and control is then returned to block 93. In this example, the warning lamp 42 of FIG. 1 is illuminated when the warning signal $S_{WARNING}$ is set equal to state A.

FIGS. 3 and 4 include delay blocks, which are typically appropriate for digital and in particular programmed microprocessor implementations. Analogous functions can be performed in an analog manner, in which case the delay blocks may not be required.

OPERATION

Returning to FIG. 1, the voltage regulator 18 is connected to the power control element of the alternator 12, which may for example be a field coil. The regulator 18 controls the amount of field current flowing in the field coil to maintain the alternator output voltage $V_{OUT}$ at a selected value, equal to $V_{TARGET}$ in this example. The current flowing to the field coil will be increased and decreased as necessary to maintain $V_{OUT}$ at the desired level as electrical loads are added or removed. The regulator 18 may also shut off field coil current when the alternator 12 is not rotating or when voltage regulation control has been lost due to failure of components in the field current switching circuit.

As explained above, the equalization monitor 40 generates a warning signal $S_{WARNING}$ that has two possible states. In one example the fault state is a 0V signal indicative of a fault in the electrical system or an alternator that is not producing power. The normal state is a positive DC voltage signal when the alternator 12 is producing power and no detectable faults are present in the system. The logic of the two states may be switched or configured to sink current, but distinctly different states are used to represent the two cases. When the voltage regulator 18 is operating, the equalization monitor 40 routinely checks the voltage at each terminal of the equalizer 20. If any of these voltages differs from the respective proportional value by less than a preset threshold (e.g. ±0.2V), the warning signal $S_{WARNING}$ is placed in the normal state. In one example, when the battery 22 is a 14V battery, the warning signal $S_{WARNING}$ will be placed in the normal state when the voltage $V_{NODE}$ is equal to 14.2V±0.2V. The threshold accommodates voltage offsets for normal equalizer operation that may include voltage drops along cables used in the electrical system.

If the equalization monitor 40 (in particular the warning signal generator 56) detects that a lower system voltage such as the voltage $V_{NODE}$ is operating outside of the threshold limits for a designated period of time, it determines that the equalizer 20 has either failed, or that the lower system voltage is overloaded. In this case the warning signal $S_{WARNING}$ is set to the fault state, causing the lamp 42 to be illuminated. The fault may also be signaled through other vehicle control circuits, such as a digital bus for example. In an analog implementation of this function, the lower system voltage or voltages may be monitored continuously, while in a digital implementation such monitoring may be performed on a periodic basis. In one example, a charge-ok light circuit is enabled in the normal state and the charge-ok light circuit is disabled in the fault state of the warning signal $S_{WARNING}$. Alternatively, a no-charge light circuit may be enabled when the warning signal $S_{WARNING}$ is in the fault state, either continuously, or intermittently to indicate that the equalization monitor 40 is active.

The equalization monitor 40 also provides automatic battery protection. An equalizer failure or an overload nay cause one of the lower-voltage systems to operate outside of the programmed threshold, and below its respective proportion of the system voltage. For some cases of equalizer failure, one of the lower-voltage systems may operate outside its programmed threshold and above its respective proportion of the system voltage. Both situations cause uneven battery charging that may degrade the batteries and endanger the entire electrical system. Overcharging an automotive battery may dissipate the electrolyte to the point of damaging the battery beyond repair. Either type of failure places the warning signal $S_{WARNING}$ in the fault condition as described above.

The equalization monitor 40 also responds to a problem of this type by altering the value of $V_{TARGET}$. If either $V_1$ or $V_2$ is larger than the respective maximum permissible value, the equalization monitor 40 reduces $V_{TARGET}$. This enables the alternator 12 to continue operating while also protecting the system batteries. For example, in a dual voltage 14V/28V system, if the 14V system drops to 10V, the equalization monitor 40 will reduce $V_{TARGET}$ from 28V to 24V, thereby preventing the upper battery 24 from charging at 18V (28V−10V). As described above, the equalization monitor 40 limits the maximum voltage across each battery to a respective defined limit, and prevents the voltage across each battery from exceeding the respective limit.

Similarly, if a failure of the equalizer 20 allows the 14V system voltage to rise above 14V, the equalization monitor 40 will reduce $V_{TARGET}$, thereby reducing $V_{OUT}$ to the point where the equalizer output voltage $V_{NODE}$ falls below the maximum programmed limit for the 14V system. For example, in a dual voltage 14V/28V system, if the 14V system rises to 16V, then a reduction in $V_{TARGET}$ to lower $V_{OUT}$ from 28V to 26V should return the 14V system to approximately 14V. The alternator will continue to produce power while the lower voltage system is regulated at 12V and the upper voltage system is regulated at 26V. As before, the warning signal $S_{WARNING}$ is placed in the fault state to indicate that the system is degraded even though the alternator continues to produce power.

If an overload or system malfunction causes voltage compensation to exceed a programmed differential voltage, e.g. 4V, then the regulator will turn off field current. Such a condition may occur with a short in one of the electrical systems or with a short in the equalizer between 28V and 14V. This causes the alternator to cease producing power, and the no-charge light circuit is activated.

FIG. 5 provides a schematic representation of the operation of the system of FIGS. 1–5, with reference to the voltage $V_1$ across the lower battery 22. In FIG. 5 the dotted line is used to indicate the nominal voltage of the 14V system. As long as the lower voltage V1 remains below an upper threshold No. 1 and above a lower threshold No. 1, normal operation is indicated, the value $V_{TARGET}$ remains at its nominal level, and the warning signal $S_{WARNING}$ is in the normal state. In the event $V_1$ exceeds the upper threshold No. 1 or falls below the lower threshold No. 1, the warning signal $S_{WARNING}$ is changed to the fault state to indicate that the system is not operating normally. In the event $V_1$ exceeds the upper threshold No. 2 (equal to $T_1$ in the foregoing description) then the monitor 40 begins to reduce the value of $V_{TARGET}$, thereby reducing $V_{OUT}$ and protecting the lower battery 22.

Though not shown in FIG. 5, a similar set of thresholds is used to protect the battery 24.

Many charges can be made to the monitoring system described above. For example, the monitor 40 may be used in electrical systems that do not include an equalizer, e.g. to monitor against uneven charging caused by connection of a load to the node 26. The monitor 40 can also be used in electrical systems that do not include one or both of the loads 28, 30.

As used herein, the term "alternator" is intended broadly to uncover a wide range of devices for generating DC power, including alternators, generators and other devices. The term "comparator" is also intended broadly to encompass analog, digital and programmed processor implementations. The term "set" is used to mean one or more. Thus, a set of batteries can include one, two, or more batteries.

The foregoing detailed description has described only a few of the many forms that this invention can take. This detailed description is therefore intended by way of illustration and not limitation. It is only the following claims, including all equivalents, that are intended to define the scope of this invention.

What is claimed is:

1. A method for controlling a vehicle electrical system to protect against battery over-charging, said method comprising:
   (a) providing a vehicle electrical system comprising an alternator operative to supply a voltage $V_{OUT}$ to a string of at least first and second series-connected rechargeable batteries;
   (b) regulating the voltage $V_{OUT}$ to a target value $V_{TARGET}$;
   (c) reducing the target value $V_{TARGET}$ when a voltage $V_1$ across the first battery exceeds a first threshold value $T_1$;
   (d) reducing the target value $V_{TARGET}$ when a voltage $V_2$ across the second battery exceeds a second threshold value $T_2$; and
   (e) repeating at least one of (c) and (d) a plurality of times.

2. The method of claim 1
   wherein the alternator comprises two output and ground terminals at voltages $V_{OUT}$ and $V_{GND}$, respectively;
   wherein the string of batteries comprises a node between the first and second batteries at a voltage $V_{NODE}$;
   wherein $V_1$ is equal to $V_{NODE}-V_{GND}$; and
   wherein $V_2$ is equal to $V_{OUT}-V_{NODE}$.

3. The method of claim 1 further comprising:
   (f) generating a warning signal when at least one of $V_1$ and $V_2$ deviates excessively from respective nominal values.

4. The method of claim 1 wherein $T_1$ is equal to $T_2$.

5. The method of claim 1 wherein the vehicle electrical system of
   (a) further comprises at least a higher voltage load and a lower voltage load connected across respective sets of batteries of the string.

6. The method of claim 5 wherein the vehicle electrical system of
   (a) further comprises an equalizer coupled to at least the first and second batteries of the string.

7. A vehicle electrical system comprising:
   a string of at least first and second series-connected rechargeable batteries;
   a voltage regulator operative to regulate the voltage $V_{OUT}$ to a target value $V_{TARGET}$;
   a first comparator responsive to a first voltage $V_1$ across the first battery and a first threshold value $T_1$, said first comparator operative to command a reduction in the target valve $V_{TARGET}$ when $V_1$ exceeds $T_1$;
   a second comparator responsive to a second voltage $V_2$ across the second battery and a second threshold value $T_2$, said second comparator operative to command a reduction in the target value $V_{TARGET}$ when $V_2$ exceeds $T_2$.

8. The invention of claim 7 wherein the string of batteries comprises a node between the first and second batteries at a voltage $V_{NODE}$; wherein $V_1$ is equal to $V_{NODE}-V_{GND}$; and wherein $V_2$ is equal to $V_{OUT}-V_{NODE}$.

9. The invention of claim 7 further comprising:
   a warning signal generator operative to generate a warning signal when the at least one of $V_1$ and $V_2$ deviates excessively from respective nominal values.

10. The invention of claim 7 wherein $T_1$ is equal to $T_2$.

11. The invention of claim 7 further comprising:
    at least a higher voltage load and a lower voltage load connected across respective sets of batteries of the string.

12. The invention of claim 11 further comprising:
    an equalizer connected across at least the first and second batteries of the string.

* * * * *